US012138772B2

(12) United States Patent
Jeon et al.

(10) Patent No.: US 12,138,772 B2
(45) Date of Patent: Nov. 12, 2024

(54) MOBILE PARTS TABLE

(71) Applicant: Divergent Technologies, Inc., Los Angeles, CA (US)

(72) Inventors: Patrick Minwoo Jeon, Glendale, CA (US); Jason Vincent Gallagher, Lomita, CA (US); Vincent Arunas Burokas, Los Angeles, CA (US); Lukas Philip Czinger, Santa Monica, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 274 days.

(21) Appl. No.: 17/731,092

(22) Filed: Apr. 27, 2022

(65) Prior Publication Data

US 2022/0347831 A1 Nov. 3, 2022

Related U.S. Application Data

(60) Provisional application No. 63/182,672, filed on Apr. 30, 2021.

(51) Int. Cl.
B25H 1/04 (2006.01)
B25H 1/10 (2006.01)

(52) U.S. Cl.
CPC ............... B25H 1/04 (2013.01); B25H 1/10 (2013.01)

(58) Field of Classification Search
CPC ... B23Q 3/02; B23Q 3/04; B23Q 3/06; B23Q 3/101; B23Q 3/105–108; B25H 1/0021; B25H 1/0035; B25H 1/005; B25H 1/08; B25H 1/04; B25J 9/0084; B25J 9/0096;
(Continued)

(56) References Cited

U.S. PATENT DOCUMENTS 5,203,226 A 4/1993 Hongou et al.
5,742,385 A 4/1998 Champa
5,990,444 A 11/1999 Costin
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

Primary Examiner — Robert F Neibaur
(74) Attorney, Agent, or Firm — ARENTFOX SCHIFF LLP

(57) ABSTRACT

A parts table may comprise a structure including a first surface, a base including a platform affixed to the structure, and kinematic couplers secured to the base and configured to dock with complementary kinematic couplers of an alignment structure, the alignment structure being secured to a floor of an assembly cell, the first surface including a parts interface configured to hold a plurality of parts for assembly in the assembly cell, such that each part of the plurality of parts can be picked up by a robot of the assembly cell when the parts table is docked with the alignment structure, and the parts table is movable to a new location when the kinematic couplers are undocked from the alignment structure.

12 Claims, 10 Drawing Sheets

(58) Field of Classification Search
CPC ......... Y10T 29/53961; Y10T 29/49998; Y10T 29/53435
USPC ................... 269/45, 266; 29/281.1, 281, 559
See application file for complete search history.

(56) References Cited

U.S. PATENT DOCUMENTS

| | | | |
|---|---|---|---|
| 6,010,155 A | 1/2000 | Rinehart | |
| 6,096,249 A | 8/2000 | Yamaguchi | |
| 6,140,602 A | 10/2000 | Costin | |
| 6,145,180 A | 11/2000 | Kogai et al. | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,178,227 B2 * | 2/2007 | Ghuman | B62D 65/02 29/559 |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,675 B2 * | 4/2017 | Southwell | B62D 65/04 |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |

(56) References Cited

U.S. PATENT DOCUMENTS

| | | |
|---|---|---|
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |

(56) References Cited

U.S. PATENT DOCUMENTS

| | | | |
|---|---|---|---|
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2011/0099788 A1 | 5/2011 | Kilibarda |
| 2014/0015186 A1* | 1/2014 | Wessel | B23Q 17/005 269/95 |
| 2014/0277669 A1 | 9/2014 | Nardi et al. |
| 2015/0314892 A1* | 11/2015 | DesJardien | B64F 5/10 29/559 |
| 2017/0113344 A1 | 4/2017 | Schönberg |
| 2017/0341309 A1 | 11/2017 | Piepenbrock et al. |
| 2018/0068879 A1 | 3/2018 | Wong et al. |
| 2018/0215541 A1 | 8/2018 | Belardinelli et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion in PCT/US2022/071995, mailed Sep. 1, 2022, 11 pages.

* cited by examiner

MOBILE PARTS TABLE

CROSS-REFERENCE TO RELATED APPLICATIONS

The present disclosure claims the benefit under 35 U.S.C. 119 of U.S. Provisional Patent Application No. 63/182,672, filed Apr. 30, 2021 and entitled "MOBILE PARTS TABLE", which application is incorporated by reference herein in its entirety.

BACKGROUND

Field

The present disclosure relates to robotic assembly, and more specifically to mobile parts tables and techniques for robotic assembly using mobile parts tables.

Background

Generally, vehicles, such as automobiles, trucks, aircrafts, and the like are assembled using a large number of individual structural components. These structural components are joined together to form the body, frame, interior and exterior surfaces, etc., of the vehicles. The various structural components of the vehicles provide form and support to the vehicles, and respond appropriately to different types of forces that are generated or that result from various actions of the vehicles. These structural components are of varying sizes and geometries and are joined with another part to assemble the vehicle or a part of the vehicle.

To assemble the vehicles, modern vehicle factories rely heavily on robotic assembly of structural components and may use fixtures to hold the parts used for the assembly of the vehicle. Existing fixtures used in automobile factories are configured to engage with specific parts. Therefore, each part of the vehicle that will be robotically assembled uses a unique fixture that is specific to that part, and given the large number of individual parts in a vehicle that are robotically assembled, an equally large number of fixtures are required. In fact, a modern automobile chassis can consist of thousands of assembled parts, each part requiring a specially-designed fixture for assembly. However, fixtures can be extremely expensive. In fact, it is not unusual for a single fixture for an automobile part to cost $300,000 to $500,000. The cost of the fixtures used in an automobile factory is a large portion of the cost of the entire factory. As a result, building a modern automobile factory requires a massive capital investment, making it necessary to build and sell hundreds of thousands of cars just to recapture the initial investment and break even, let alone make a profit.

In addition to their enormous cost, since fixtures can only be used for the specific part for which they are designed, if a part is changed in some way (e.g., updated design of the car's model), an entirely new fixture must be designed and built. This adds significant cost and time to the process of changing or updating car models. As a result, automobiles models are updated infrequently, for example, every five or six years or more. Furthermore, existing fixtures holding or engaged with the parts used in assembly of the vehicle are fixed to particular locations, such as near assembly stations, of the assembly factory. Therefore, once all of the parts on a fixture are used, then the parts cannot be loaded back on to that fixture until the assembly of that part of the vehicle is completed. As a result, significant amount of time is lost before the fixture is reloaded with parts for another component of the vehicle to be assembled.

Additionally, since different fixtures are fixed to different locations at the assembly factory, any changes to the assembly process of a vehicle can result in removal of the fixtures from their corresponding locations in the assembly factory and reinstalling those fixtures at new locations in the assembly factory. For example, if it is determined that a change in the sequence of the assembly process can reduce the assembly time of a vehicle or even structural component of a vehicle, then to implement the new assembly process, one or more fixtures installed in the factory may have to be removed and reinstalled in a new location of the assembly factory. Such removal and/or reinstallation of fixtures in the factory can result in significant financial costs. As a result, implementation of the improved assembly process will be delayed and the assembly factories will be continue to operate inefficiently.

SUMMARY

In contrast to conventional vehicle assembly operations, the present disclosure envisions eliminating use of fixtures to hold and/or stage parts to be used in assembly of a vehicle and/or a part of a vehicle. As described above, the fixtures used in conventional vehicle assembly operations are designed to hold only a unique part used in the assembly of the vehicle, and each fixture is fixed to particular location in the assembly factory.

In the present disclosure, techniques and approaches are described for parts tables that are configured to engage with multiple parts used in assembly of a vehicle to allow for changes in vehicle design to be implemented without requiring new parts tables or holding structures to hold any new parts. Furthermore, the techniques and approaches described in the present disclosure allow for the parts tables to engage with autonomous guided vehicles (AGVs) to enable the parts tables to be moved from one location of the assembly factory to another location of the assembly factory to allow for the parts tables to be reloaded once empty and without waiting, and to further allow one or more parts tables to be moved to different locations of the factory to implement any changes in the assembly process of the vehicle. Such techniques and approaches may be enabled through various apparatuses, systems, methods, and/or computer-readable media described herein.

A parts table in accordance with an aspect of the present disclosure may comprise a structure including a first surface, a base including a platform affixed to the structure, and kinematic couplers secured to the base and configured to dock with complementary kinematic couplers of an alignment structure, the alignment structure being secured to a floor of an assembly cell, the first surface including a parts interface configured to hold a plurality of parts for assembly in the assembly cell, such that each part of the plurality of parts can be picked up by a robot of the assembly cell when the parts table is docked with the alignment structure, and the parts table is movable to a new location when the kinematic couplers are undocked from the alignment structure.

Such a parts table further optionally includes a frame coupled to the structure and to the base, the frame configured to stabilize the structure, the base including spaced-apart elongated members to which the kinematic couplers are secured, the base including an interior region configured to accommodate entry of an autonomous guided vehicle (AGV) inside the interior region, at least one edge of the platform including a latch for engaging with the AGV when the AGV is inside the interior region of the base, a lower surface of the platform including a part retention device for mating with a complementary retention device on the AGV when the upper surface of the AGV is raised upward toward the platform, and a utility coupler interface connected to the base and configured to engage with a utility system interface connected to the alignment structure, to receive any one or more of power, data communications, or pneumatics for use at the parts table.

Such a parts table further optionally includes the AGV, when engaged with the table, using a detector to locate at least one docking target extending upward from a base plate of the alignment structure, the base plate connected to a floor surface, the AGV entering the alignment structure between two prong-like members extending laterally outward from the base plate of the alignment structure, such that the two prong-like members form a gap for the AGV to enter, the AGV being further movably guided by a plurality of guide rollers coupled along an inner edge of each prong-like member to position and engage the kinematic couplers with the complementary kinematic couplers.

Such a parts table further optionally includes a plurality of universal part interfaces connected to the parts interface, each of the universal part interfaces being configured to hold one of a plurality of differently-shaped parts, each of the universal part interfaces including a lever configured to tilt on a first axis to a second position at which the part being held is at a different orientation, the parts interface comprising a mating feature configured to engage with a complementary mating feature of each of the plurality of different parts, the mating feature including at least a pin or a ball bearing, and the parts interface comprising a compliance interface.

A parts table in accordance with an aspect of the present disclosure may comprise a structure, the structure configured with a plurality of sides for holding parts, a plurality of universal part interfaces connected with each side of the plurality of sides of the structure, each of the universal part interfaces being configured to hold a plurality of differently-shaped parts for assembly in an assembly cell, and a base connected with the structure, the base configured to rotate the structure to a first position at which a first side of the plurality of sides is accessible to a robot of the assembly cell and to rotate the structure to a second position at which a second side of the plurality of sides is accessible to the robot.

Such a parts table further optionally includes the plurality of sides of the first structure comprising three sides, the three sides facing different directions, each of the universal part interfaces being connected with the respective side of the plurality of sides via a support configured to rotate the universal part interface to a second position at which the first part is at a first orientation, each of the universal part interfaces being connected to a lever configured to tilt on a first axis to a third position at which the first part is at a second orientation, each of the universal part interfaces comprising one or more mating features configured to engage with one or more complementary mating features of each of the plurality of different parts, the one or more mating features including at least a pin or a ball bearing, a table post connected to the base, the table post being connected to a kinematic coupler, and the kinematic coupler being configured to couple with a fixture on a floor proximate to the assembly cell via kinematic coupling, and one or more latches connected to a frame, the frame connected to the base, the one or more latches configured to engage with an autonomous guided vehicle (AGV) in response to the AGV contacting the parts table.

Such a parts table further optionally includes a structure configured with a plurality of sides, and a plurality of posts located on the structure and including a first post located on a first side of the plurality of sides of the structure, and a second post located on a second side of the plurality of sides of the first structure, the first post comprising a first universal part interface, the second post comprising a second universal part interface, and each of the first and second universal part interfaces being configured to engage with multiple types of parts and being further configured to provide access to at least one of the multiple types of parts for a set of robots when positioned toward an assembly cell that includes the set of robots.

Such a parts table further optionally includes a base connected with the structure, the base being configured to rotate the structure to a first position at which the first universal part interface is positioned toward the assembly cell at a first angle to provide access to one of the multiple types of parts for at least one robot of the set of robots, the second universal part interface being positioned toward the assembly cell at a second angle to provide access to another of the multiple types of parts for at least one other robot of the set of robots, the first post comprising a first support, and a first lever, the first lever connected with the first support, the first lever connected with the first universal part interface, the first support configured to rotate the first universal part interface to a first position at which the first part is at a first orientation, the first lever configured to tilt the first universal part interface to a second position at which the first part is at a second orientation.

Such a parts table further optionally includes the second post comprising a second support, and a second lever, the second lever connected with the second support, the second lever connected with the second universal part interface, the second support configured to rotate the second universal part interface to a third position at which the second part is at a third orientation, the second lever configured to tilt the second universal part interface to a fourth position at which the second part is at a fourth orientation, and wherein at least the third orientation is different from the first orientation or the fourth orientation is different from a second orientation, the first universal part interface and the second universal part interface comprising mating features configured to engage with complementary mating features of the first part and the second part, one or more table posts being connected to a frame, the frame connected to a base, the base connected to the first structure, each of the one or more table posts being connected to a kinematic coupler, and the kinematic coupler is configured to couple with a fixture via kinematic coupling to secure the parts table proximate to the assembly cell, one or more latches being connected to the frame, the one or more latches configured to engage with an autonomous guided vehicle (AGV) in response to upward pressure applied by the AGV, the first structure being a triangular structure, each side of the plurality of sides being a vertical surface, each side of the plurality of sides intersecting at least two other plurality of sides at respective angles of between 80 and 110 degrees on top of a base connected to the first structure.

A parts table in accordance with an aspect of the present disclosure may comprise a plurality of vertical surfaces rotatable about a vertical axis, each vertical surface being adjacent to two other vertical surfaces at respective angles of at least 45 degrees, a plurality of universal part interfaces connected to the plurality of vertical surfaces, each of the plurality of universal part interfaces having a respective set of mating features configured to accept a corresponding set of features of each of a set of parts, and a base connected with the plurality of vertical surfaces, the base configured to rotate the plurality of vertical surfaces about the vertical axis to each of a plurality of positions at which a respective subset of the set of parts is accessible at one of the plurality of universal part interfaces by at least one robot associated with vehicular assembly using the set of parts.

Such a parts table further optionally includes at least one of the plurality of universal part interfaces being connected to a lever, the lever configured to tilt the corresponding mated part on a first axis.

It will be understood that other aspects of parts table for engaging with multiple parts and configured to be moved to different locations of an assembly factory will become readily apparent to those skilled in the art from the following detailed description, wherein it is shown and described in several embodiments by way of illustration. As will be realized by those skilled in the art, the disclosed subject matter is capable of other and different embodiments and its several details are capable of modification in various other respects, all without departing from the present disclosure. Accordingly, the drawings and detailed description are to be regarded as illustrative in nature and not as restrictive.

DETAILED DESCRIPTION

The detailed description set forth below in connection with the appended drawings is intended to provide a description of various example embodiments and is not intended to represent the only embodiments in which the present disclosure may be practiced. The terms "exemplary," "illustrative," and the like used throughout the present disclosure mean "serving as an example, instance, or illustration," and should not necessarily be construed as preferred or advantageous over other embodiments presented in the present disclosure. The detailed description includes specific details for the purpose of providing a thorough and complete disclosure that fully conveys the scope of the present disclosure to those skilled in the art. However, the present disclosure may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described. In addition, it should be understood that some elements that are described in the singular can also be implemented as more than one element, and some elements described in the plural can also be implemented as a single element. For example, description of "a processor," "a memory," etc., should be understood to include implementations that have multiple processors, memories, etc., performing the task(s) described. Likewise, description of "multiple processors," "multiple memories," etc., should be understood to include implementations that have a single processor, a single memory, etc.

In this regard, FIGS. 1A through 1E illustrate various examples that are conventionally used in manufacturing including vehicle manufacturing. Each specific vehicle part is positioned and/or retained by various robots, for example, a part of a vehicle chassis, during pre-assembly, assembly, and/or post-assembly operations, such as on an assembly line.

The present disclosure describes various techniques and approaches for parts tables that are configured to engage with multiple parts used in assembly of a vehicle and allow for the parts tables to engage with autonomous guided vehicles (AGVs) to enable the parts tables to be moved from one location of the assembly factory to another location of the assembly factory.

Figure 1A:
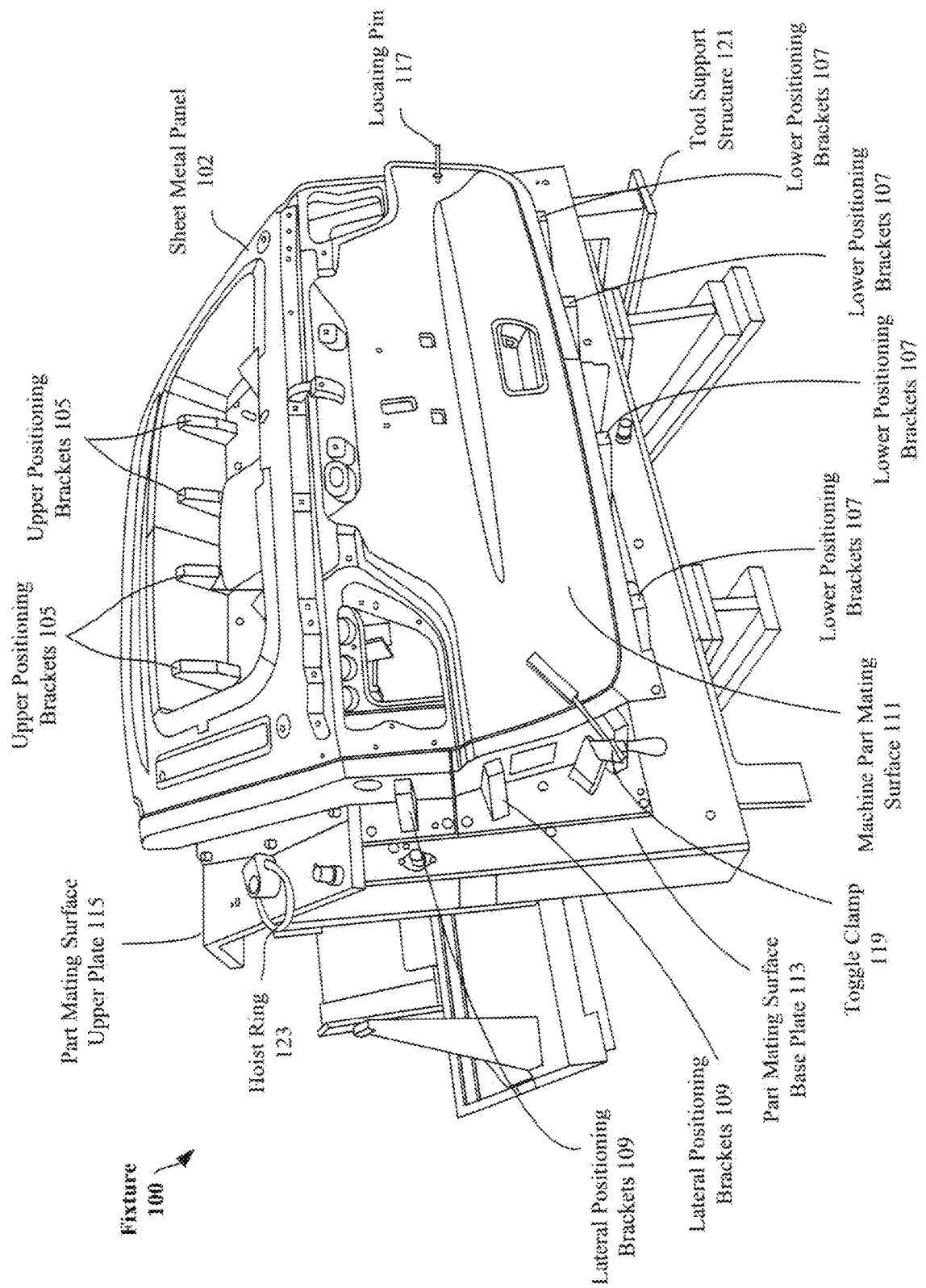
FIGS. 1A-1E illustrate examples of fixtures, as is known in the art of automotive manufacturing.

FIG. 1A illustrates a conventional fixture 100 designed to retain a particular sheet metal panel 102 (e.g., a door panel, a floor panel, and the like) of a vehicle during various assembly operations. In this example, fixture 100 includes multiple upper positioning brackets 105 that retain an upper portion of sheet metal panel 102, multiple lower positioning brackets 107 that retain a lower portion of the sheet metal panel, and multiple lateral positioning brackets 109 that retain the side portions of the sheet metal panel. Fixture 100 also includes a machine part mating surface 111, a part mating surface base plate 113, and a mating part surface 115 upper plate that provide rigidity to sheet metal panel 102. Fixture 100 also includes a locating pin 117 to guide sheet metal panel 102, and a toggle clamp 119 to lock the sheet metal panel into position on the fixture. Fixture 100 also includes a tool support structure 121 to support all of the other components of the fixture. Because fixture 100 is a large, heavy structure, the fixture also includes a hoist ring 123 to allow the fixture to be moved and positioned.

The various parts of the fixture 100 such as the positioning brackets 105, 107, 109, mating parts surfaces 111, 115, locating pin 117, toggle clamp 119, tool support structure 121, and the hoist ring 123 are designed to hold only the sheet metal panel 102. Furthermore, such various parts of the fixture 100 are positioned in their respective locations on the fixture 100 to hold the sheet metal panel 102 in a predetermined orientation. The predetermined orientation of the fixture 100 is selected based on some assumptions and/or estimations of how far a robotic arm would be able to travel to engage with the sheet metal panel 102 on the fixture 100. Such assumptions and/or estimations are prone to errors. For example, if the robot is positioned in a different location than an expected location when the predetermined orientation of the fixture 100 is selected, then the robotic arm may not be able to fully engage with the sheet metal panel 102 held by the fixture 100. Similarly, if the sheet metal panel 102 moves in an unintended manner and/or unintentionally deflects, then the robotic arm may not be able to sufficiently engage with the sheet metal panel 102. These errors can accumulate over the assembly process, therefore, relatively large design tolerances and redundancies may be desired when designing the fixtures, which can increase the complexity of designing such fixtures and increase the cost to build such fixtures, particularly when multiple other parts are joined with panel 102, because precision may be difficult to achieve.

Figure 1B:
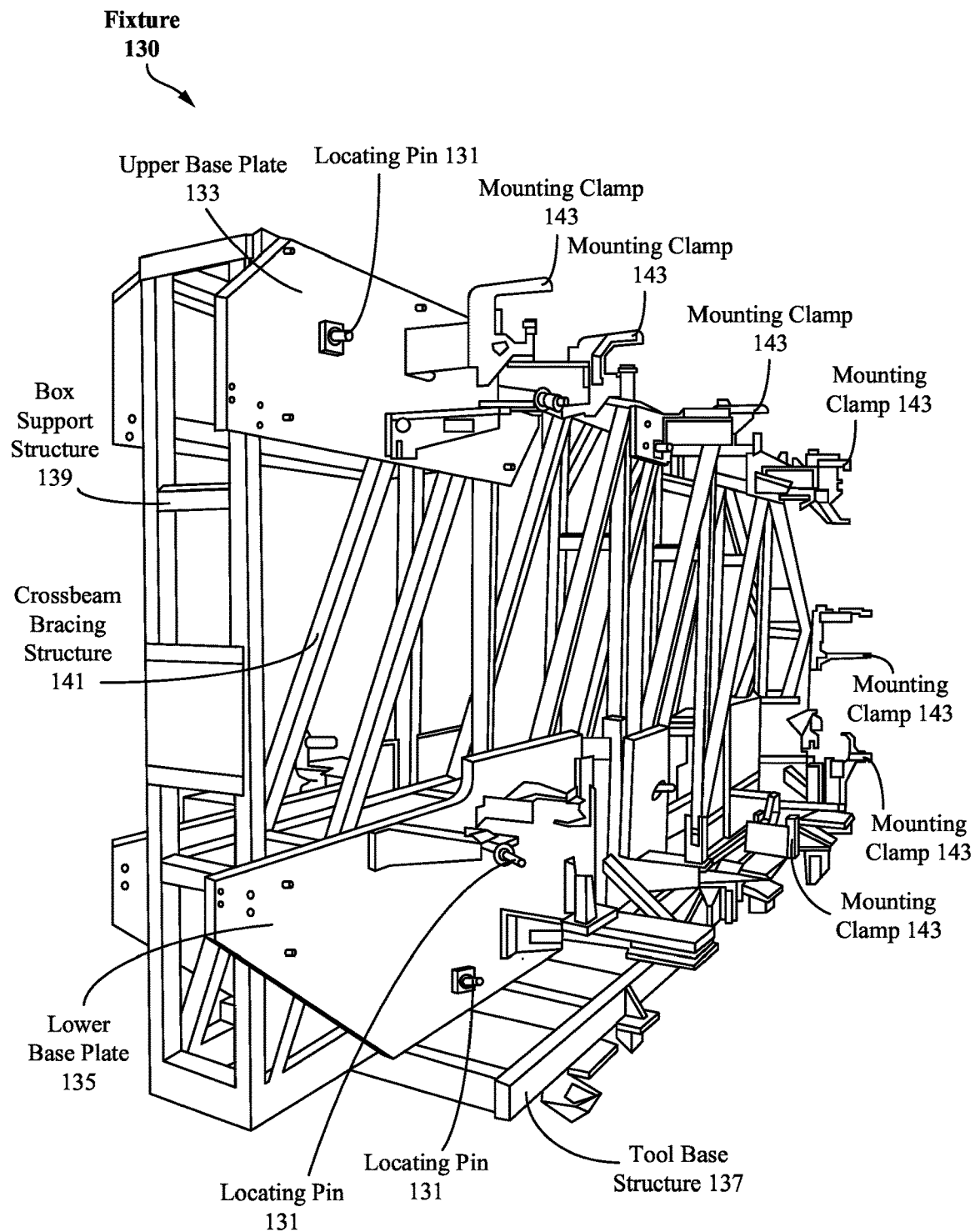

FIG. 1B illustrates another conventional fixture 130 that is used to retain a particular structure of a car during a joining operation. In the illustrated example, fixture 130 is not engaged with its structure, and illustrates the complexity that is typical of fixtures. Fixture 130 includes locating pins 131, an upper base plate 133, a lower base plate 135, and a tool base structure 137. Fixture 130 also includes a box support structure 139 and a crossbeam bracing structure 141 to support all of the components of the fixture. Fixture 130 also includes mounting clamps 143 to mount the car structure to the fixture.

Figure 1C:
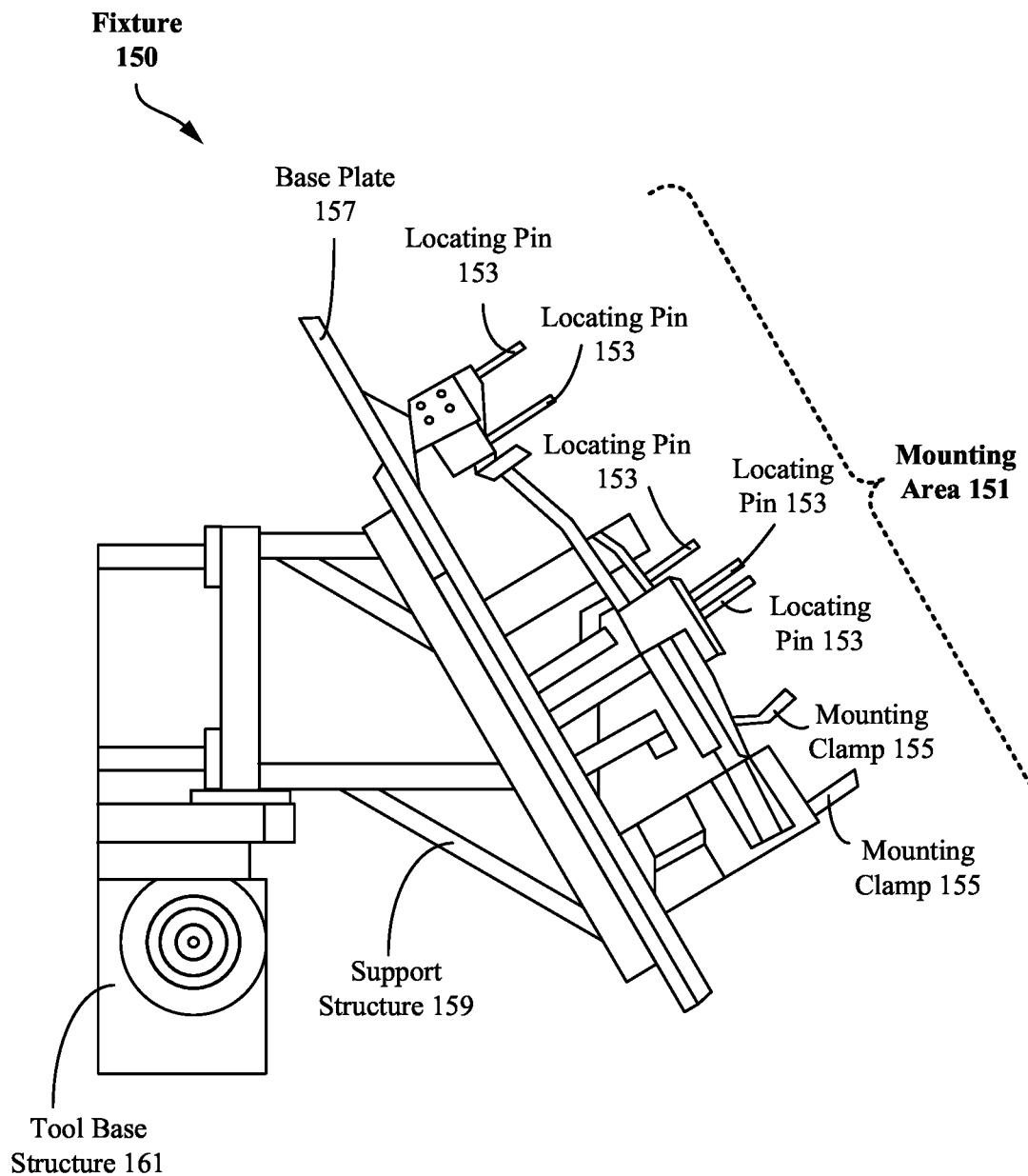

FIG. 1C illustrates a side perspective view of another conventional fixture 150. Fixture 150 is secured to the floor to provide a fixed and rigid positioning of the structure the fixture holds. Specifically, fixture 150 has a mounting area 151 to which its particular structure is connected by locating pins 153 and mounting clamps 155, thereby fixing the structure at mounting area 151 for a joining operation by one or more robotic interfaces. Fixture 150 also includes a base plate 157, a support structure 159, and a tool base structure 161 to support all of the other components of the fixture.

Figure 1D:
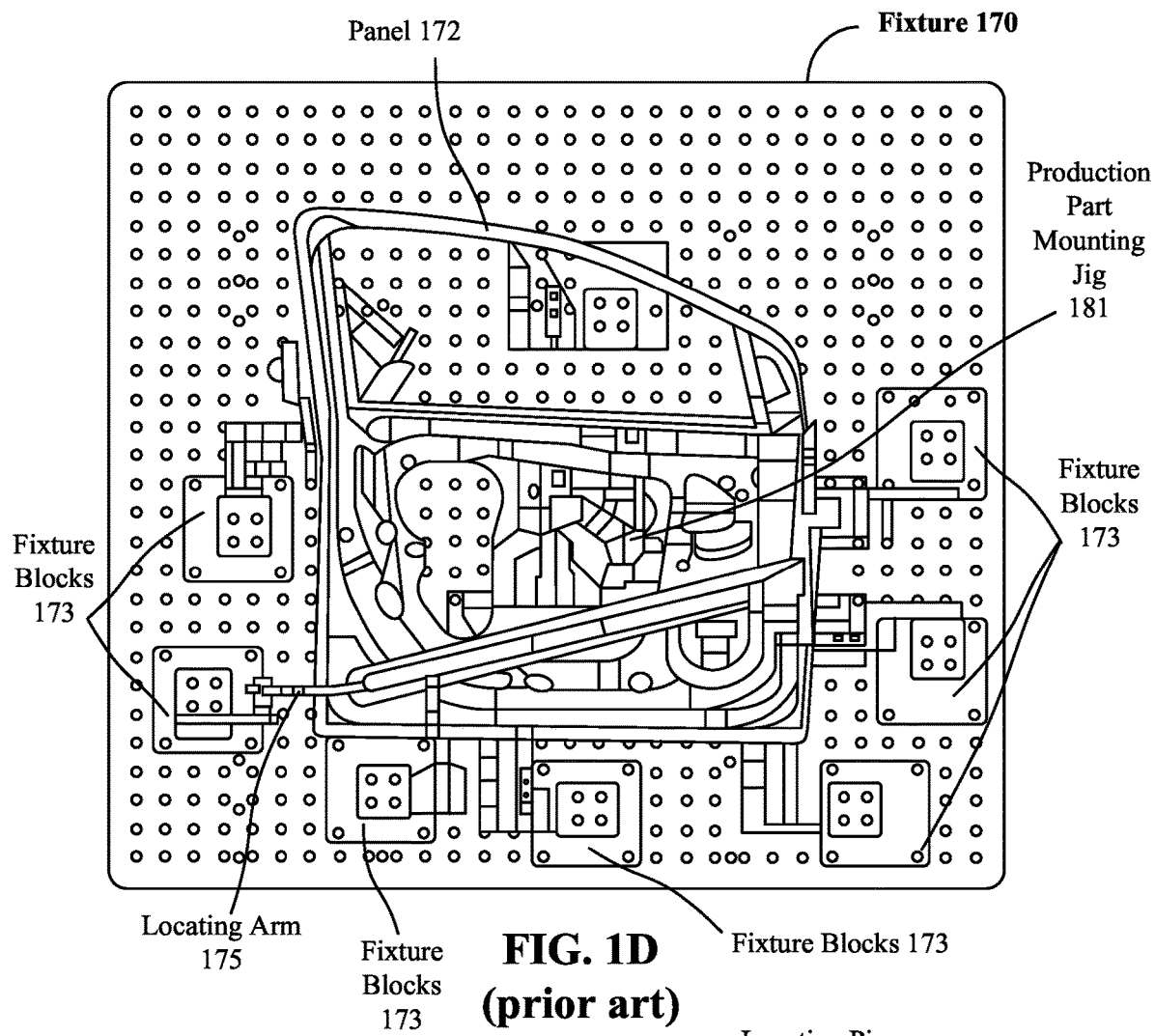
Figure 1E:
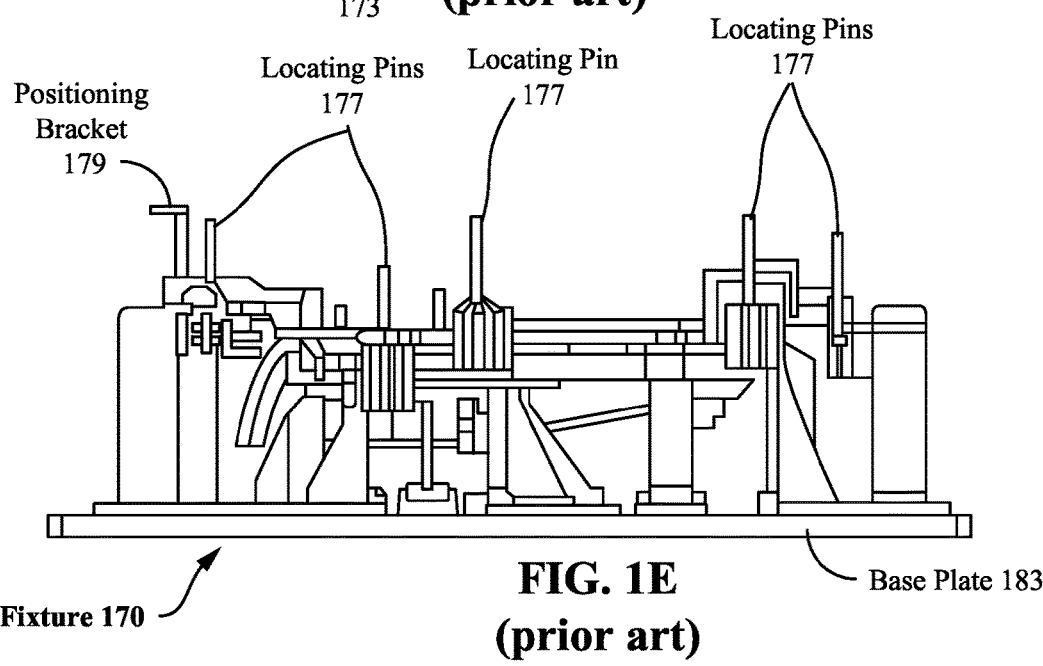

FIGS. 1D-1E illustrate still another example of a conventional fixture 170. FIG. 1D illustrates a top perspective of fixture 170, and FIG. 1E illustrates a side perspective of the fixture.

Conventional fixture 170 is configured to engage with and retain a panel 172 (e.g., a door panel, a floor panel, and the like). For example, the fixture includes multiple fixture blocks 173 to secure panel 172 to the fixture to prevent unintended movement and/or deflection of the panel during various assembly operations. Fixture 170 also includes a locating arm 175, locating pins 177, a positioning bracket 179, and a production part mating jig 181 to locate panel 172 during a mounting operation. Fixture 170 also includes a base plate 183.

Fixtures 130, 150, 170 of FIGS. 1B-1E all have similar limitations as fixture 100 of FIG. 1A. For example, each of the fixtures 130, 150, 170 are designed to support and hold only a particular part used in the assembly process of a vehicle and in a predetermined orientation, as fixture 100. Each of fixtures 100, 130, 150, and 170 will be fixed to a specific location in the assembly factory, such as near an assembly station. Therefore, any changes in the vehicle assembly process and/or design, may result in the removing the fixtures 100, 130, 150, 170 and reinstalling them elsewhere in the factory.

Figure 2:
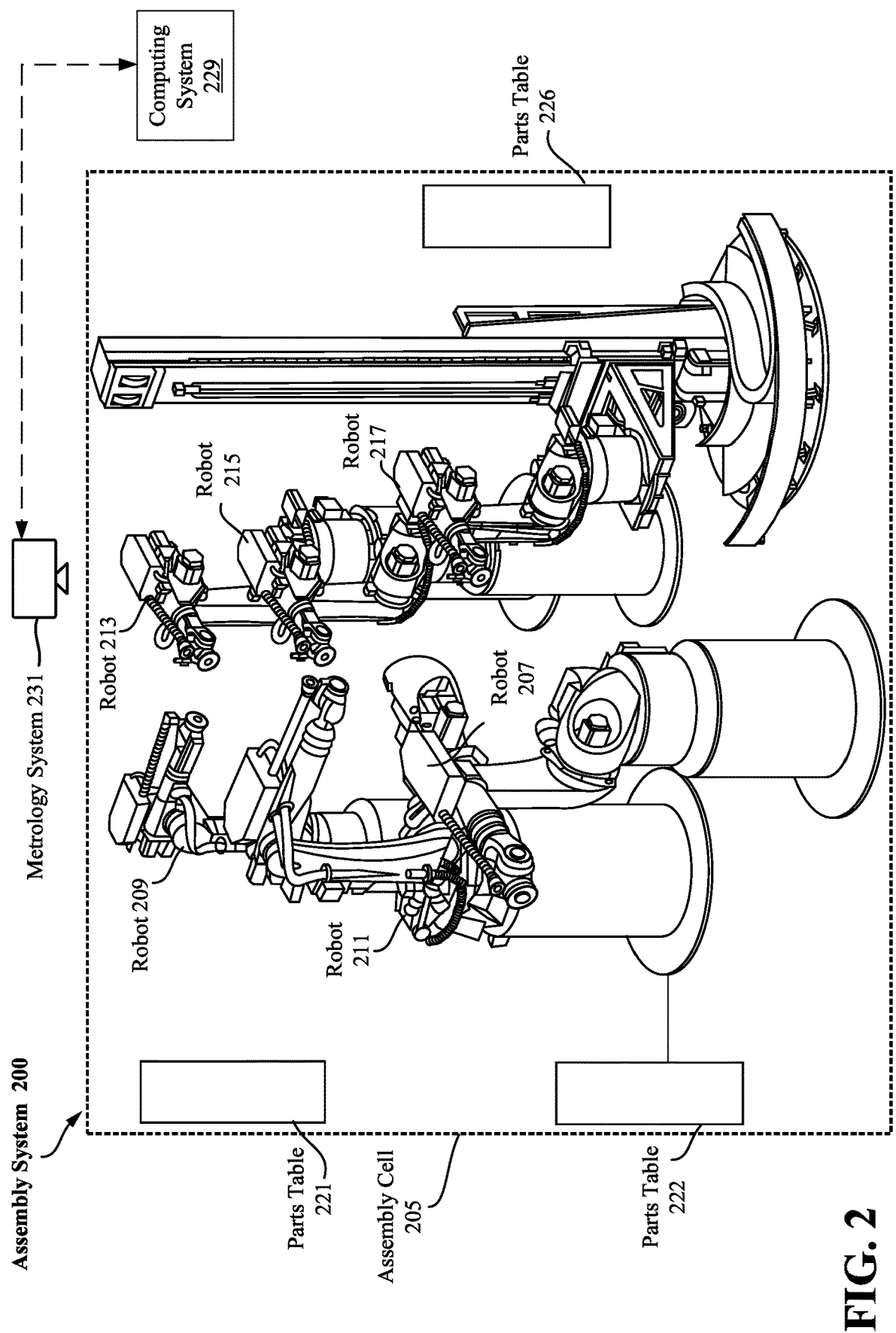
FIG. 2 illustrates a perspective view of an example assembly system, which includes a plurality of parts tables configured to engage with multiple parts used to assemble at least a portion of a vehicle.
Figure 3A:
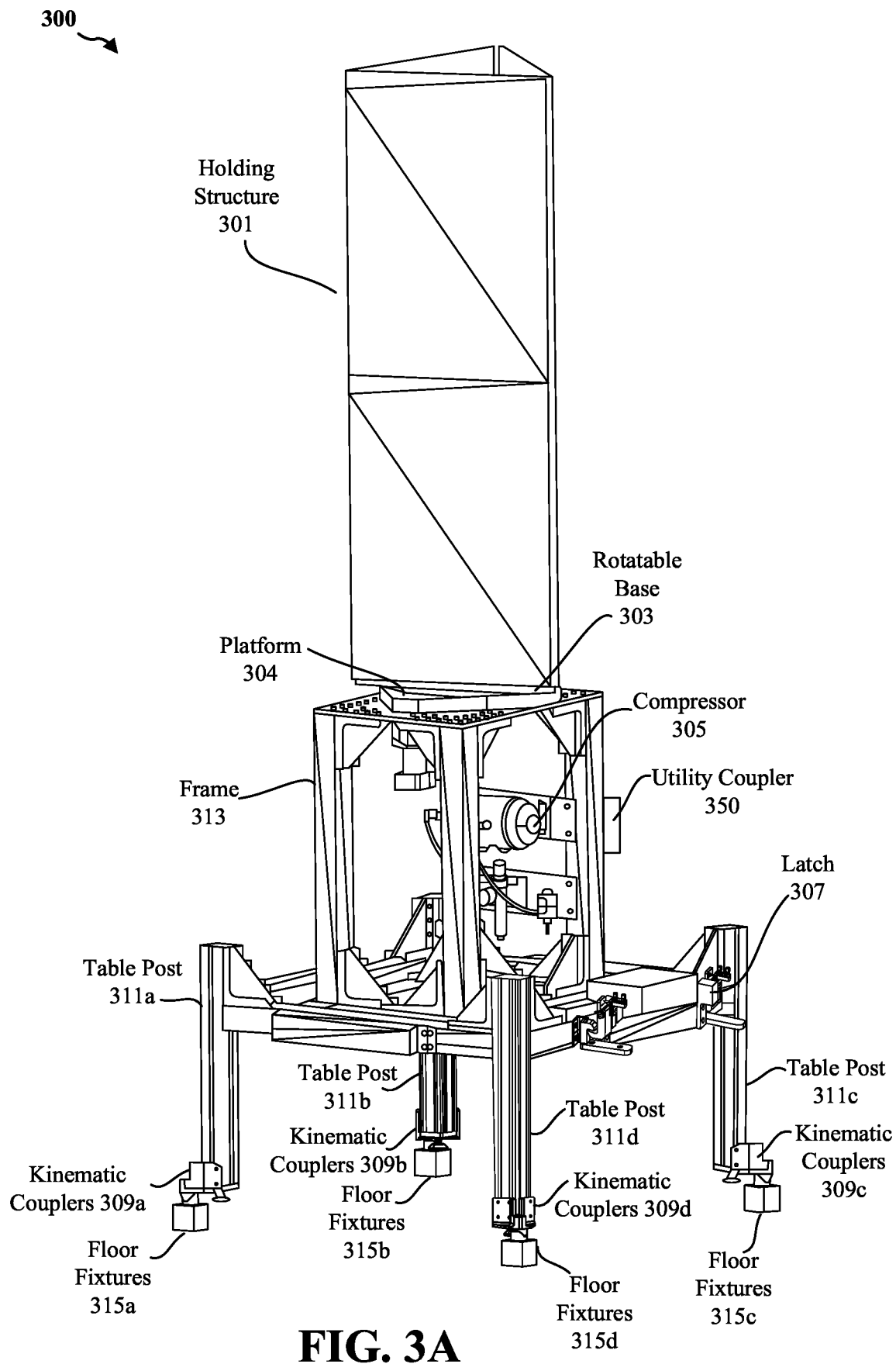
FIGS. 3A-3D illustrate detailed views of an example parts table configured to engage with multiple parts used in assembly of a vehicle and autonomous guided vehicles (AGV) to move the parts table to different locations, which includes a plurality of robots configured to perform various example operations for assembly of at least a portion of a vehicle.
Figure 3B:
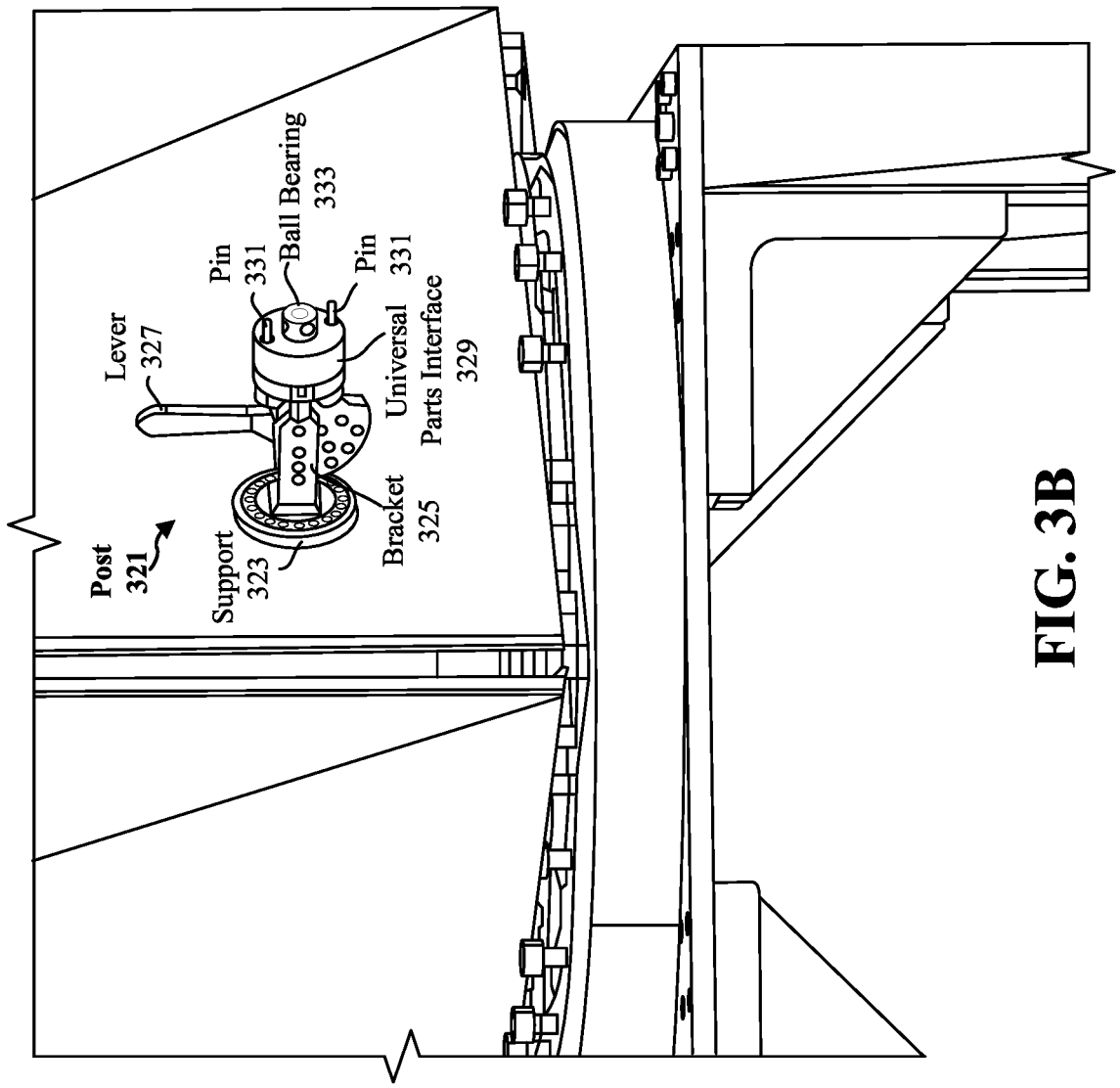
Figure 3C:
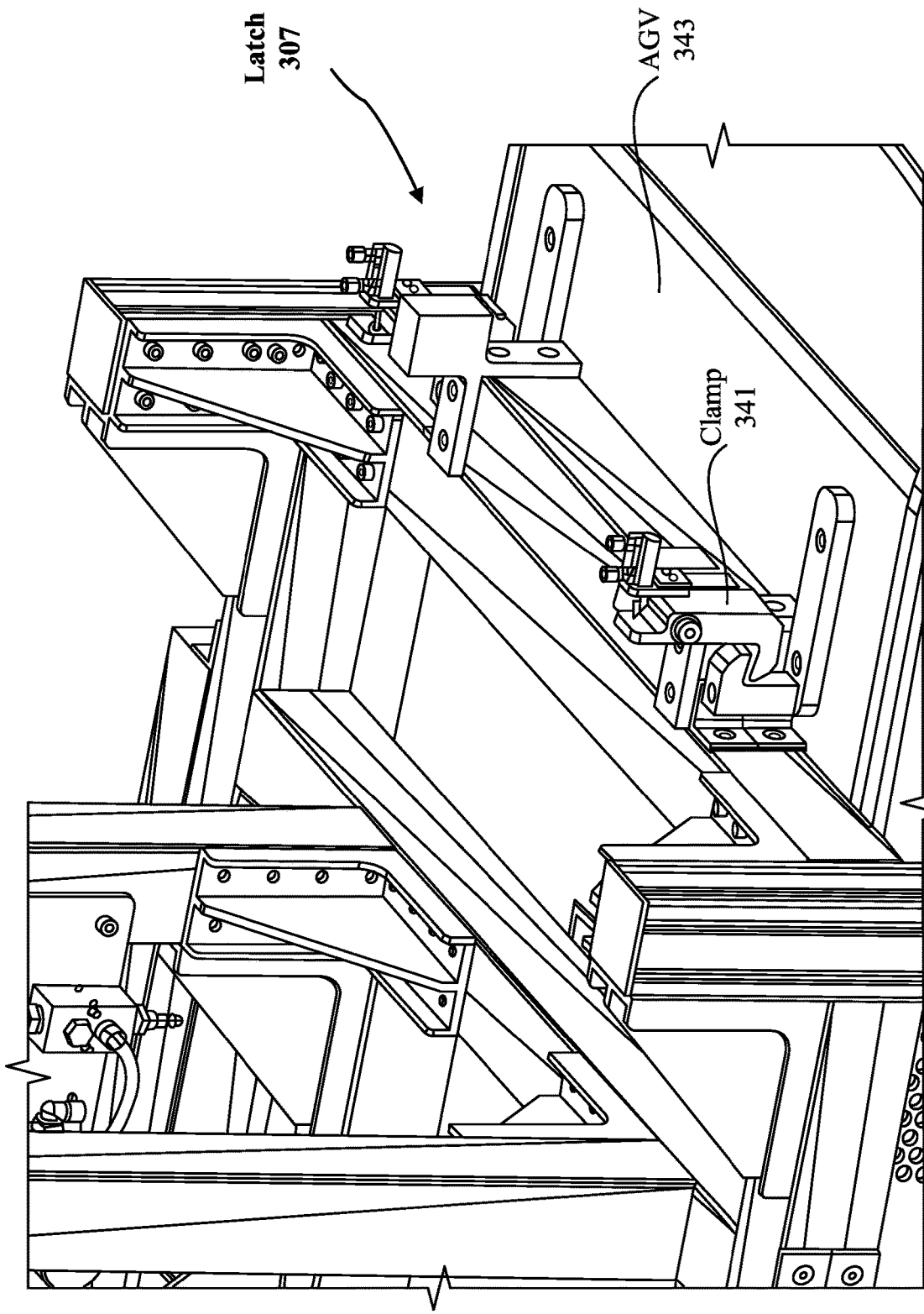
Figure 3D:
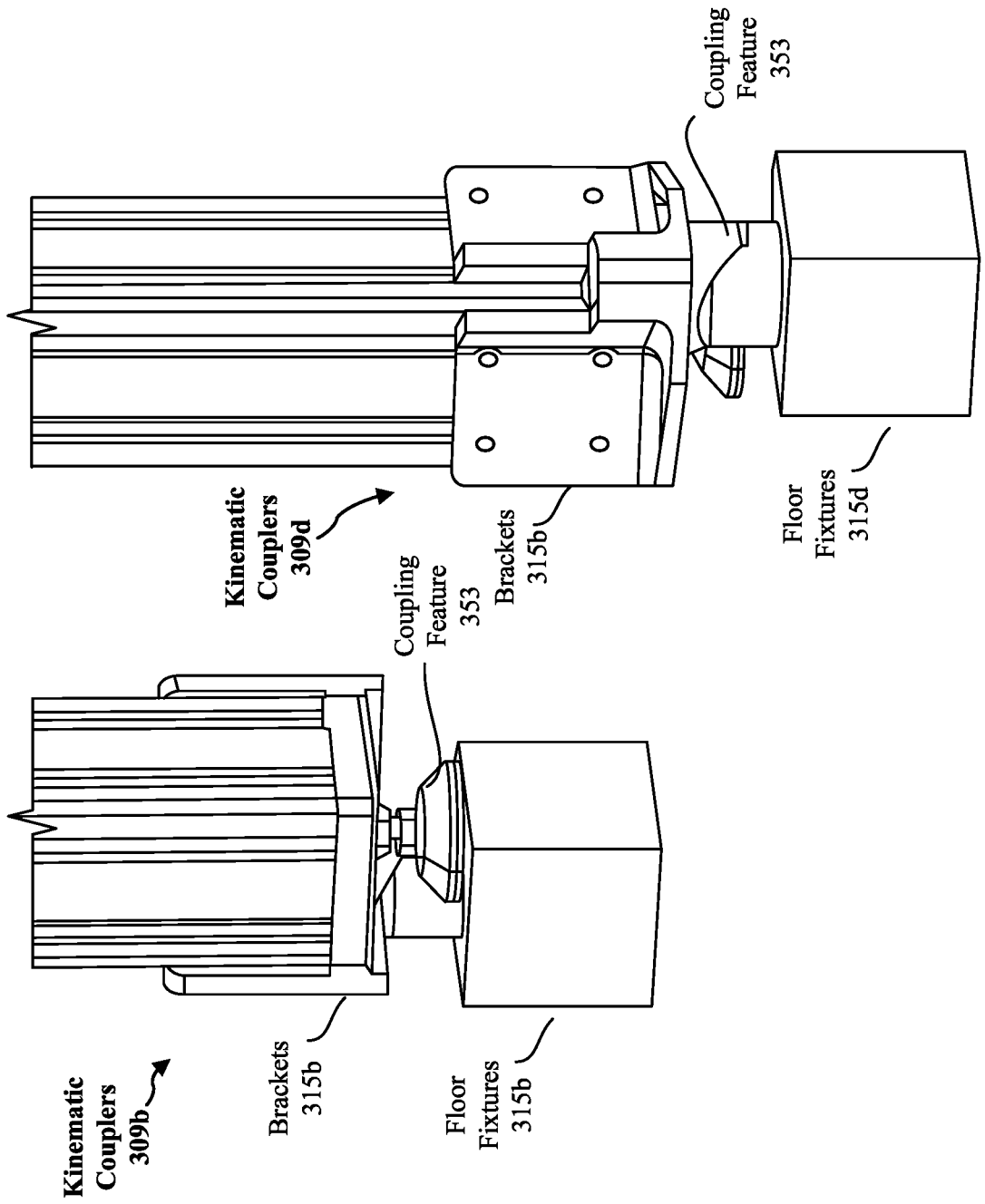

Turning now to FIGS. 2 through 3D, various embodiments are provided for parts tables configured to engage with multiple different parts used in an assembly of a vehicle and engage with autonomous guided vehicles (AGVs) such that parts tables moved to different locations of an assembly factory to be reloaded and reorganized.

First, with reference to FIG. 2, the figure illustrates a perspective view of an assembly system 200. Assembly system 200 may be employed in various operations associated with assembly of a vehicle, such as robotic assembly of a node-based vehicle. Assembly system 200 may include one or more elements associated with at least a portion of the assembly of a vehicle.

An assembly cell 205 may be configured at the location of assembly system 200. Assembly cell 205 may be a vertical assembly cell. Within assembly cell 205, assembly system 200 may include one or more parts tables 221, 222, 226, and sets of robots 207, 209, 211, 213, 215, 217. Each of the parts tables 221, 222, 226 may be configured to engage with multiple different types of parts and each parts table may be configured to engage with an AGV (e.g., AGV 343 as shown in FIG. 3C) so that the parts table can be effectively turned into a mobile parts table. In some implementations, each of the parts table 221, 222, and 226 may be strategically positioned within the assembly cell 205 such that a single parts table can be engaged with by multiple robots. For example, parts table 221 may positioned within the assembly cell 205 so that robots 209 and 211 can engage with the parts on the parts table 221. Similarly, parts table 226 can be positioned at location with the assembly cell 205 so that robots 213 and 217 can engage with the parts on that parts table 226.

Each of the parts tables 221, 222, 226 may include a holding structure (e.g., holding structure 301 as shown in FIG. 3A). The holding structure may be a multi-sided holding structure and may include multiple universal part interfaces (e.g., universal part interface 329 as shown in FIG. 3B). Each universal part interface may be configured to engage with and/or hold various types of parts used in assembly of a vehicle. The holding structures of the parts table may be connected to a rotatable base (e.g., rotatable base 303 as shown in FIG. 3A) on the parts table, and each holding structure may be rotated to make it easier for the robotic arms of robots 207, 209, 211, 213, 215, 217 of the assembly cell 205 to engage with the parts on the holding structures of the parts tables 221, 222, 226. Additional details of a holding structure, the universal part interface, rotatable base are described below with reference to FIGS. 3A-3D.

Each of the parts tables 221, 222, 226 may include a holding structure (e.g., holding structure 301 as shown in FIG. 3A). The holding structure may be a multi-sided holding structure and may include multiple universal part interfaces (e.g., universal part interface 351 as shown in FIG. 3C). Each universal part interface may be configured to engage with and/or hold various types of parts used in assembly of a vehicle. The holding structures of the parts table may be connected to a rotatable base (e.g., rotatable base 303 as shown in FIG. 3A) on the parts table, and each holding structure may be rotated to make it easier for the robotic arms of robots 207, 209, 211, 213, 215, 217 of the assembly cell 205 to engage with the parts on the holding structures of the parts tables 221, 222, 226. Additional details of a holding structure, the universal part interface, rotatable base are described below with reference to FIGS. 3A-3D.

Each of the parts tables 221, 222, 226 may include multiple table posts (e.g., table posts 311 as shown in FIG. 3A) that are configured with kinematic couplers (e.g., kinematic couplers 309, as shown in FIG. 3A) at one end of the posts. In some implementations, a part table may have four posts with a kinematic coupler attached to one end of each of the posts. The parts tables 221, 222, 226 may be configured to kinematically couple with one or more floor fixtures of the factory via the kinematic couplers on the posts of the parts tables. The parts tables 221, 222, 226 can be secured to various locations on the factory via the kinematic couplers on the posts of the parts tables. For example, floor fixtures configured to receive the kinematic couplers of the parts tables may be fixed on the floors where assembly cells are created, factory locations where parts can be loaded on to the parts tables, and the like.

In some implementations, the parts tables 221, 222, 226 may be coupled with a floor fixture on the factory floor by moving the parts table laterally near the floor fixtures until the kinematically couplers on the parts table couple with the floor fixtures. While these parts tables 221, 222, 226 can be kinematically coupled to a location on the factory floor, they are not permanently fixed to those locations. The parts tables 221, 222, 226 may be moved by decoupling the parts tables from the floor fixtures of the factory. In some implementations, the parts tables 221, 222, 226 may be decoupled from the floor fixtures by moving the parts tables laterally. Additional details on kinematic couplers are described below with reference to FIG. 3B.

In some implementations, each of the parts tables 221, 222, and 226 may be configured with controller, other communication units, interfaces, and/or protocols. The parts tables 221, 222, and 226 may be configured to communicate with one or more computing systems including, but not limited to, AGVs, metrology system 231, computing system 229, and the like.

The parts tables 221, 222, 226 may be configured to engage and securely connect with the AGVs in response to an upward pressure applied by the AGVs. For example, the parts table 221, 222, 226 may be configured to engage and securely connect with the AGVs in response to the AGVs applying upward pressure on the parts table from underneath the parts table. In some implementations, the AGVs may be configured to roll underneath the parts tables and apply upward pressure on the parts tables. In some implementations, the parts tables 221, 222, 226 may include one or more latch mechanisms (e.g., latch 307 as shown in FIG. 3A and FIG. 3C), which are configured to engage and disengage with at least one or more portions of the AGV (e.g., AGV 343 as shown in FIG. 3C). In some implementations, the one or more latch mechanisms may be configured to engage with the AGV by latching onto a side and/or an edge of the AGV once the respective side and/or the edge of the AGV moves past the latch mechanism in response to the AGV applying an upward pressure on the parts table. In some implementations, a latch mechanism of the parts table may be configured to passively engage and/or lock with the AGV (e.g., a side and/or edge of the AGV). In some implementations, once the one or more latch mechanisms of the parts table successfully engage, connect, and/or lock with the AGV, the parts tables 221, 222, 226 may be configured to transmit a message to the AGV indicating that the successful engagement and/or locking of the parts table with the AGV.

Once the AGV is successfully engaged with the parts table, the AGV may decouple the parts table from the floor fixtures and autonomously move the parts table to a desired location. For example, the AGV may autonomously move the parts table into the assembly cell 205 once the parts table is loaded with parts. Similarly, the AGV may autonomously move the parts table out of the assembly cell 205 and to a part loading stage and/or station. Therefore, such engagement with AGVs allows the parts tables 221, 222, 226, as described in the present disclosure, to become mobile when necessary and moved around an assembly factory. Such ease of mobility by each of the parts tables 221, 222, 226 along with being configured to engage with numerous types of the parts allow for a new assembly process, changes to an assembly process, a new design of the vehicle, changes to a design of a vehicle, and the like, to be implemented without significant financial costs and while significantly reducing the amount time used to implement such changes.

In some implementations, assembly system 200 may also include a computing system 229 to issue commands to the various controllers of the parts tables and robots in the assembly cell 205. In this example, computing system 229 is communicatively connected to the parts tables and robots of assembly cell 205 through wireless communication. Assembly system 200 may also include a metrology system 231 that can accurately measure the positions of the robotic arms of the robots and/or the parts held by the robots. The computing system 229 and the metrology system 231 may be in communication with each other. In some implementations, the metrology system 231 may be configured to provide measurements of the robotic arm movements and positions to the computing system 229, and based on the robotic arm movement and position data, the computing system 229 may be configured to determine whether any adjustments can be made to the location of a parts table or to a component (e.g., holding structure) of the parts table. For example, based on the distance a robotic arm is traveling to engage with a part on a parts table, the computing system may determine whether the traveled distance breaches a threshold, and if so, then determine whether a parts table can be moved closer to that robotic arm or if a holding structure of a parts table can be rotated to cause the parts to be a position relative to the robotic arm that the travel distance of the robotic arm is reduced and/or within the threshold.

In some implementations, the computing system 229 can be configured to receive data indicating changes with reference to assembly of a vehicle (e.g., vehicle assembly process changes, vehicle design changes, and the like), and, based on the received data, the computing system 229 may be configured to cause the AGVs, parts tables, robots, and/or other computing systems in the assembly factory to implement the indicated changes. For example, the computing system 229 may receive data (e.g., computer-aided design (CAD) data) indicating a new assembly process, and in response, the computing system 229 may transmit messages to the parts tables indicating the changes to the new assembly process, and/or instructions to the parts tables and/or the AGVs to cause the parts tables to be rearranged to implement the changes to the assembly process. Similarly, the computing system 229 may receive data indicating a new vehicle design, and in response, the computing system 229 may transmit messages to the parts tables indicating the changes to the new assembly process, and/or instructions to the parts tables and/or the AGVs to cause the parts tables to be moved to parts stations to be loaded with new parts compatible with new vehicle design as desired.

Turning now to FIG. 3A, a detailed view of an example parts table 300 configured to engage with multiple parts used in assembly of a vehicle and autonomous guided vehicles (AGV) to move the parts table to different locations is illustrated. Parts tables 221, 222, 226 of FIG. 2 are similarly configured as parts table 300.

Parts table 300 includes a holding structure 301, a rotatable base 303 with a platform 304, a frame 313, a compressor 305, one or more latches 307, one or more table posts 311a, 311b, 311c, 311d, collectively referred to as table posts 311, one or more kinematic couplers 309a, 309b, 309c, 309d, collectively referred to as kinematic couplers 309. The holding structure 301 can be a multi-sided holding structure. Each side of the holding structure 301 may be a vertical surface. The sides/surfaces of the holding structure may face different directions. The sides/surfaces of the holding structure may be adjacent and/or intersect with other sides at an angle. In some implementations, a side of the holding structure may be adjacent to another side at an angle less than 90 degrees (e.g., 45 degrees). In some implementations, a side/surface of the holding structure may mate and/or intersect with another side of the holding structure at an angle between 70 and 120 degrees, between 80 and 110 degrees, or other ranges of angles as desired. In some implementations, the holding structure 301 can be a three-sided structure. Each side of the holding structure 301 may have multiple surfaces as desired. In some implementations, the holding structure 301 can be triangular, box-like, or other shapes as desired. Holding structure is shown as being in the shape of a triangle in FIG. 3A.

The holding structure 301 can be connected to a rotatable base 303 on platform 304 as shown in FIG. 3A. The rotatable base 303 has a platform 304 that can be configured to rotate 360 degrees. The rotation of the rotatable base 303 may cause the holding structure 301, which is coupled or affixed to the rotatable base 303 on one or more surfaces of holding structure 301, to rotate to a first position at which one or more different parts on the holding structure 301 may be accessible to one or more robots of an assembly cell (e.g., assembly cell 205). The rotatable base 303 may be caused to be rotated to allow for robotic arms of robots of an assembly cell (e.g., assembly cell 205) to more easily and efficiently engage with the parts on the holding structure 301. For example, if the distance a robotic arm is traveling to engage with the parts on one of the sides of the holding structure is greater than desired, then the parts on that side of the holding structure 301 can be brought closer to that robotic arm by rotating that holding structure 301 until that side of the holding structure 301 is closer to the robotic arm.

In some implementations, a controller of the parts table 300 may cause the rotation of the rotatable base 303. In some implementations, the parts table 300 may receive an instruction and/or a message from a computing device (e.g., computing system 229, metrology system 231, a robot, an AGV (e.g., AGV 343 as shown in FIG. 3C), and the like) that indicates a number of degrees to rotate the rotatable base 303, and rotatable base 303 is caused to be rotated the corresponding number of degrees. In some implementations, the rotatable base 303 may be configured to be manually rotatable, and a user (e.g., an assembly worker) may manually rotate the rotatable base 303 to a desired number of degrees.

Any side of the holding structure 301 may be configured to engage with different parts used in an assembly. For example, a single side of the holding structure 301 may be configured to engage with parts used in the assembly of different portions of the vehicle. Similarly, each side of the holding structure 301 may be configured to engage with different parts used in an assembly. Any side of the holding structure 301 may be connected to one or more universal part interfaces configured to engage with any part and/or a large number of different parts that are used in an assembly of a vehicle. A universal or common part interface may be connected to a side of the holding structure 301 via a post attached to that side of the holding structure 301. The holding structure 301 may be stiff, e.g., have a frame to stabilize the holding structure 301, or may be flexible to allow for handling of delicate parts, as desired.

Parts table 300 may also have a utility coupler 350 that allows for coupling with a utility system interface to provide power, data communications, pneumatics, and/or other external inputs to rotatable base 303, compressor 305, AGVs coupled to parts table 300, or other portions of parts table 300. A utility system interface may also be coupled to posts 311, alignment structures such as posts 321, or other connections to parts table 300 as desired.

An example of a universal part interface is shown in FIG. 3B. The universal or common part interface 329, as shown in FIG. 3B, is connected to a side of the holding structure 301 via the post 321. Each side of the holding structure can be connected to multiple universal part interfaces via their respective posts. Therefore, while a single universal part interface 329, connected via the post 321, is shown in FIG. 3B, a person skilled in the art should appreciate that multiple universal part interfaces 329 can be connected to any side of the holding structure 301 via respective posts 321. Posts 321 may be square in cross-section as shown in FIG. 3B, or may be round, hexagonal, or other cross-sectional geometries as desired. Further, posts 321 may be any elongated member, and may be spaced apart from each other at any distance, without departing from the scope of the present disclosure.

Each post 321 may include a support 323, a bracket 325, a lever 327, a universal part interface 329, as shown in FIG. 3B. The support 323 of the post 321 may be rotatable. The support 323 of the post 321 can be rotated 360 degrees. In some implementations, the support 323 may be configured to be rotated manually by a user (e.g., an assembly worker). In some implementations, the support 323 may be caused to be rotated by a controller of the parts table 300 and/or another computing device. In some implementations, the support 323 may be connected to a servo motor, and the controller of the parts table 300 and/or another computing device may be configured to cause the support 323 to rotate by transmitting instructions to the servo motor to cause rotation of the support 323. The post 321 may include the bracket 325. In some implementations, the bracket 325 may be a double flange. The bracket 325 may be connected to the support 323 as shown in FIG. 3B.

The bracket 325 may be connected with the lever 327 as shown in FIG. 3B. The lever 327 may be configured to tilt in different directions relative to a reference point. For example, the lever 327 may be configured to tilt up and down relative to the assembly floor. The lever 327 may be configured to tilt over a range of degrees (e.g., between zero and 90 degrees). In some implementations, the lever 327 may be configured to tilt in increments of 11 degrees. In some implementations, the lever 327 may be configured to be tilted manually by a user. In some implementations, the lever 327 may be caused to be tilted by a controller of the parts table 300 and/or another computing device. In some implementations, the lever 327 may be connected to a servo motor and the controller of the parts table 300 and/or another computing device may be configured to cause the lever 327 to tilt by transmitting instructions to the servo motor to cause tilt of the lever 327. Lever 327 may be tilted in one or more directions, and or a single axis or multiple axes, as desired.

The lever 327 may be connected to the universal part interface 329 as shown in FIG. 3B. The universal parts interface 329 may be configured with one or more mating features that are configured to engage with complementary features on a part being loaded on the post 321. The complementary features on the part may be printed on the part. In some implementations, the one or more mating features of the universal part interface 329 may one or more pins 331 (e.g., 2 pins) and/or ball bearings 333. The pins 331 may be configured to mate with a complementary feature on a part loaded on the post 321. In some implementations, the ball bearings 333 may be configured to expand once the part is engaged with by the post 321.

In some implementations, through the rotation of the rotatable base 303, a first universal part interface 329 on one side of the holding structure 301 may be positioned toward the assembly cell (e.g., assembly cell 205) at a first angle, to provide access to at least one robot of the set of robots in the assembly cell, a part with which the first universal part interface 329 is engaged. A second universal part interface 329 on another side of the holding structure 301 may be positioned at a second angle, to provide access to at least one other robot in the assembly cell, a part with which the second universal part interface 329 is engaged. In some implementations, the first and second angles may be different. In some implementations, the respective parts with which the first and the second universal part interfaces 329 are engaged may be different. In some implementations, the respective parts with which the first and the second universal part interfaces 329 are engaged may be same.

The post 321 may be configured to include one or more compliance fittings (not shown separately), which may be referred to as a compliance interface herein. In some implementations, the one or more compliance fittings/compliance interfaces may be positioned adjacent to the universal part interface 329. In some implementations, the one or more compliance fittings may be included within the universal part interface 329. In some implementations, one or more of the compliance fittings may include two plates that are connected with each other via a spring assembly, and with an air gap between the two plates. In such implementations, when compressed, the compliance fittings are configured to allow six degrees of freedom of movement of the part engaged by the universal part interface 329.

In some implementations, the spring of the one or more compliance fittings may be a non-linear spring. The spring rate of the spring of the one or more compliance fittings on post 321 may be selected such that the spring can compress more when a heavier part is loaded and less when a lighter part is loaded. In some implementations, a compliance fitting may be configured from any compressible material and/or a combination of compressible materials. The one or more compliance fittings may be configured to be compliant enough to support parts of various different weights, sizes, and/or geometries. For example, the one or more compliance fittings may be compliant enough to support a lightweight part with a first set of dimensions and support a heavy part with a different set of dimensions.

In some implementations, the amount of compliance of the compliance fittings may be predetermined and passive. In some implementations, the amount of compliance of the compliance fittings may be configured to be actively controlled. In some implementations, the compliance fittings may be actively controlled using pneumatics, and the compliance fittings may be connected to a source of pressurized air, such as the compressor 305 shown in FIG. 3A. In such implementations, the compliance fittings may be configured to receive air injections from the source of pressurized air (e.g., the compressor 305) to reduce the amount of compliance and increase the stiffness of the post 321. The compliance fittings may be configured to release air from the compliance fittings to increase the amount of compliance and reduce the stiffness of the post 321.

For example, if a heavier or a larger part is loaded on to the post 321 and it is desired to reduce the movement of such part while loaded on to the parts table 300, then the amount of compliance of the compliance fittings of the post 321 can be reduced by injecting air to increase the stiffness of the post 321. In some implementations, a controller of the parts table 300 and/or another computing device in communication with the parts table 300 may control the amount of compliance of the compliance fittings by causing air to be injected into the compliance fittings to increase the stiffness of the post 321 or by causing air to be released from the compliance fittings to reduce the stiffness of the post 321. The controller of the parts table 300 and/or another computing device may be configured to control the amount of compliance of the compliance fittings of the parts table 300 based on size, weight, dimensions, and/or other geometries of the part. The controller of the parts table 300 and/or another computing device may determine and/or receive data related to size, weight, dimensions, and/or other geometries of a part based on data from a CAD file and/or other configuration data related to the assembly of that vehicle. For example, if a first part of a first set of dimensions and weight is loaded on a first post 321, and a second part of different set of dimensions and weight is loaded on a second post 321, then the controller of the parts table 300 and/or another computing device may set the amount of compliance of the first post 321 to be different from the amount of compliance of the second post 321. Therefore, the compliance of the compliance fittings of each post 321 of the parts table 300 can be controlled independently and set to a different compliance.

Such compliance fittings may provide an interface for a given part, and may allow a part to be engaged by the post 321 without holding the part in a rigid fixed position. Furthermore, the compliance fittings described herein allow a robot to engage with the part being held by the post 321 without applying excessive force on the part. Therefore, such compliance fittings can reduce damages to a part. Additionally, since such compliance fittings allow for the part to be securely engaged by the post 321 without holding the part in a rigid fixed position, they increase the probability that a robot successfully engages with the part. Thus, they allow for error tolerances in a robotic assembly system and/or cell (e.g., assembly system 200, assembly cell 205).

Returning to FIG. 3A, the parts table 300 may be configured with integrated pneumatics. The parts table 300 may include a compressor 305 (e.g., a micro compressor, a mini compressor, and the like). The compressor 305 may be connected to a frame 313, which may be connected to base 303. In some implementations, the compressor 305 may be configured to be recharged electrically. As described above, in some implementations, the compressor 305 may be connected with compliance fittings of the post 321 to inject pressurized air into the compliance fittings. The compressor 305 may be connected to one or more latches on the parts table 300, which may be on a platform of parts table 300, such as latch 307, and assist in activating the one or more latches on the parts table 300. The latch 307 may be connected to frame 313. In some implementations, the latch 307 may be configured to passively lock with an AGV (e.g., AGV 343 as shown in FIG. 3C). In some implementations, the latch 307 may be configured to actively unlock from an AGV. In some implementations, the latch 307 may be actively controlled using pneumatics (e.g., compressor 305).

A detailed view of the latch 307 is shown in FIG. 3C. Latch 307 may include one or more clamps, such as one or more clamps 341. The clamps 341 may be spring loaded and configured to engage and/or mate with a corresponding or complementary feature on an AGV 343 in response to the AGV 343 applying upward pressure to the parts table 300. For example, an AGV 343 may position itself underneath the parts table 300 and apply upward pressure to the parts table 300, and in response one or more clamps 341 may engage with a corresponding feature on the AGV 343 causing the latch 307 to lock the parts table 300 with the AGV 343. Clamps 341 and/or latches 307 may act as retention devices for AGV 343, parts, or other items within assembly cell 205 as desired.

AGV 343 may engage with parts table 300 through use of one or more detectors to locate at least one docking target of parts table 300, e.g., latch 307, clamp 341, etc., such that AGV 343 can engage with and/or enter into parts table 300.

AGV 343 may enter into an alignment structure portion of parts table 300, which may be defined by one or more parts of parts table 300, e.g., latches 307, clamps 341, posts 311, kinematic couplers 309, floor fixtures 315, or other features on parts table 300 or in assembly cell 205. Latch 307 and/or clamp 341 may extend in any direction, e.g., upward from a base plate of an alignment structure (posts 311, etc.) of parts table 300, downward, laterally, etc. Further, AGV 343 may be guided in moving into contact with parts table 300 in various ways, e.g., through guide rollers coupled along latch 307, slots in AGV 43 having tapers, etc., to more precisely engage with parts table 300. Many possible guiding connectors may be used without departing from the scope of the present disclosure. Guide rollers may be coupled along any edge of latch 307, clamp 341, or other parts of parts table 300 or assembly cell 205, e.g., inner edges, outer edges, multiple edges, etc., without departing from the scope of the present disclosure.

AGV 343 may interact with parts table 300 as parts are delivered and/or removed from assembly cell 205. Parts table 300 may accommodate entry of AGV 343 underneath parts table 300, inside an interior region of parts table 300, i.e., between posts 311, or may be coupled to latch 307 while a portion of AGV 343 remains external or alongside parts table 300. Many possible interactions, contacting points, and couplings between AGV 343 and parts table 300 are possible within the scope of the present disclosure. AGV 353 may be raised toward and/or lowered away from parts table 300 and/or one or more parts of parts table 300, e.g., platform 304.

As described above, unlocking of the latch 307 from the AGV 343 may be actively controlled. For example, a controller of the parts table 300 and/or another computing device in communication with parts table 300 may be configured to control the unlocking of the latch 307 from the AGV 343. In some implementations, the controller of the parts table 300 and/or another computing device in communication with the parts table 300 may be based on the location of the parts table 300. For example, the controller of the parts table 300 and/or another computing device in communication with the parts table 300 may be configured to cause the latch 307 to unlock from the AGV 343 when the parts table 300 is in an assembly cell, at a parts loading area, and the like. In some implementations, locations where the latch 307 can be caused to be unlocked from the AGV 343 may be based on CAD data related to the assembly of the vehicle, the assembly system, assembly factory, and the like. In some implementations, CAD data related to the assembly of the vehicle, the assembly system, assembly factory may update a previously determined set of locations where the latch 307 can be caused to be unlocked by adding and/or removing one or more locations of the assembly factory to the set. Latch 307 may be prong shaped, conical, trapezoidal, or other geometrical shape, and may extend laterally outward, downward, or in other directions, to enable AGV 343 to repeatably and reliably mate with latch 307 and/or parts table 300.

Returning back to FIG. 3A, the parts table 300 may include one or more table posts, such as the table posts 311a, 311b, 311c, 311d, collectively referred to as table posts 311. Each table post 311 may be connected with a kinematic coupler, such as kinematic couplers 309a, 309b, 309c, 309d, collectively referred to as kinematic couplers 309. Kinematic couplers 309 may include brackets connected to coupling features configured to repeatedly locate and couple with fixed features, such as the floor fixtures 315a, 315b, 315c, 315d, collectively referred to as floor fixtures 315.

Floor fixtures 315 may be used as an alignment structure for parts table 300, and may dock parts table 300 in a particular place within assembly cell 205 and may be proximate to assembly cell 205. By knowing where the floor fixtures 315 are located within an assembly cell 205, kinematic couplers 309 may allow for more precise placement of parts table 300, which may allow for robots 209, 211, 213, 215, 217 to pick up or otherwise engage with parts on part table 300 more efficiently.

The kinematic couplers 309 may repeatedly couple and decouple, or dock and undock, from the floor features 315. A more detailed view of the kinematic couplers 309 coupled with floor fixtures 315 is shown in FIG. 3D. As shown in FIG. 3D, kinematic coupler 309 may include universal part interface 351 connected to coupling feature 353. The coupling feature 353 may be configured to allow the coupling feature to locate the floor fixture 315 and couple with floor fixture 315, as shown in FIG. 3D. The coupling feature 353 may be configured to repeatedly couple with the floor fixture 315 and decouple from the floor fixture 315. Such kinematic coupling features 353 allow for the parts table 300 to be mobile when necessary while allowing it to be temporarily coupled to certain locations when desired. Kinematic coupling features 353 allow for parts table 300 to be moved or movable as desired.

Figure 4:
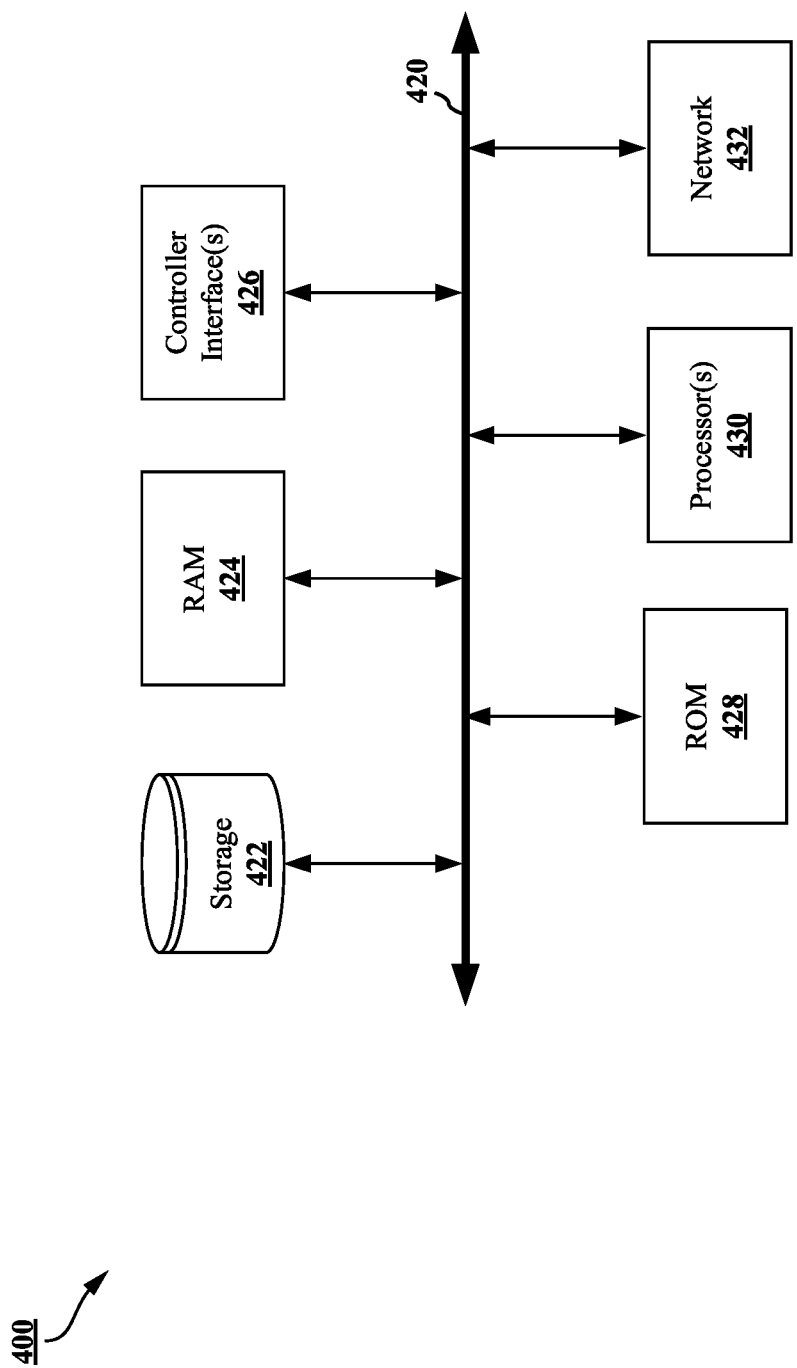
FIG. 4 is a block diagram of an example controller processing system configured to execute one or more sets of instructions to direct at least one robot for various operations associated with assembly of at least a portion of a vehicle

With respect to FIG. 4, a block diagram illustrates an embodiment of a processing system 400. The processing system 400 may comprise at least one controller associated with at least one parts table. For example, referring to FIG. 2, the processing system 400 may be an embodiment of at least one of the controllers associated with at least one of the parts table 221, 222, 226. In another example, referring to FIGS. 3A through 3D, the processing system 400 may be an embodiment of the controller of parts table 300.

The system 400 may include various types of machine-readable media and interfaces. As illustrated, the system 400 includes at least one interconnect 420 (e.g., at least one bus), a permanent storage device 422, random-access memory (RAM) 424, at least one controller interface(s) 426, read-only memory (ROM) 428, at least one processor(s) 430, and a network component 432.

The interconnect 420 may communicatively connect components and/or devices that are collocated with the system 400, such as internal components and/or internal devices within a housing of the system 400. For example, the interconnect 420 may communicatively connect the processor(s) 430 with the permanent storage device 422, RAM 424, and/or ROM 428. The processor(s) 430 may be configured to access and load computer-executable instructions from at least one of the permanent storage device 422, RAM 424, and/or ROM 428.

The permanent storage device 422 may be non-volatile memory that stores instructions and data, independent of the power state (e.g., on or off) of the system 400. For example, the permanent storage device 422 may be a hard disk, flash drive, or another read/write memory device.

ROM 428 may store static instructions enabling basic functionality of the system 400, as well as the components therein. For example, ROM 428 may store instructions for the processor(s) 430 to execute a set of processes associated with a robot of at least a portion of a vehicle, for example, as described with respect to one or more of the robots, above. Examples of ROM 428 may include erasable programmable ROM (EPROM) or electrically EPROM (EEPROM), compact disc ROM (CD-ROM) or other optical disk storage, magnetic disk storage or other magnetic storage devices, and/or another computer-accessible and computer-readable medium that may store program code as instructions and/or data structures.

RAM 424 may include volatile read/write memory. RAM 424 may store computer-executable instructions associated with runtime operation(s) by the processor(s) 430. In addition, RAM 424 may store real-time data captured during assembly of at least a portion of a vehicle, for example, as described with respect to one or more of FIGS. 2 through 3D, above.

The processor(s) 430 may be implemented with one or more general-purpose and/or special-purpose processors. Examples of general-purpose and/or special-purpose processors may include microprocessors, microcontrollers, DSP processors, and/or any other suitable circuitry configured to execute instructions loaded from at least one of the permanent storage device 422, RAM 424, and/or ROM 428. Alternatively or additionally, the processor(s) 430 may be implemented as dedicated hardware, such as at least one field programmable gate array (FPGA), at least one programmable logic device (PLD), at least one controller, at least one state machine, a set of logic gates, at least one discrete hardware component, or any other suitable circuitry and/or combination thereof.

The interconnect 420 may further communicatively connect the system 400 with one or more controller interface(s) 426. The controller interface(s) 426 may communicatively connect the system 400 with various circuitry associated with one or more parts table, AGV, robots, and/or other computing devices, for example, during assembly of at least a portion of a vehicle. Instructions executed by the processor(s) 430 may cause instructions to be communicated with a parts table through the controller interface(s) 426, which may cause movement and/or other actions of the part table in association with assembly of at least a portion of a vehicle. For example, instructions executed by the processor(s) 430 may cause signals to be sent through the controller interface(s) 426 to circuitry and/or other machinery of a parts table in order to determine which parts on the universal part interfaces of the parts table is being accessed by robots in association with assembly of at least a portion of a vehicle, to determine whether one or more sides of the parts table are empty, to determine a next side of the parts table to be positioned toward the assembly cell, transmit instructions causing the parts table to be rotated to a position at which the determined next side is positioned toward the assembly cell. Similarly, the instructions executed by the processor(s) 430 may cause signals to be sent through the controller interface(s) 426 to circuitry and/or other machinery of a parts table in order to determine whether a parts table is empty.

Instructions executed by the processor(s) 430 may cause instructions to be communicated with an AGV through the controller interface(s) 426, which may cause movement and/or other actions of the AGV in association with assembly of at least a portion of a vehicle. For example, instructions executed by the processor(s) 430 may cause signals to be sent through the controller interface(s) 426 to circuitry and/or other machinery of an AGV in order to cause an AGV to move towards and contact an empty parts table in an assembly cell, cause the AGV to move the empty parts table to an parts loading and/or staging area to be refilled, determine a set of parts to be loaded on the parts table, and cause the AGV to return the reloaded parts table to the assembly cell.

In some embodiments, the system 400 may include a network component 432. The network component 432 may be configured to communicate over a network, for example, in order to transmit and/or receive instructions associated with assembly of at least a portion of a vehicle. Instructions communicated over a network through the network component 432 may include instructions associated with assembly of at least a portion of a vehicle, and may be communicated before, during, and/or after assembly of at least a portion of a vehicle. Examples of a network through which the network component 432 may communicate may include a local area network (LAN), a wide area network (WAN), the Internet, an intranet, or another wired or wireless network.

Various aspects described herein may be implemented at least partially as software processes of a computer-programming product. Such processes may be specified as a set of instructions recorded on a machine-readable storage medium. When a set of instructions is executed by the processor(s) 430, the set of instructions may cause the processor(s) to perform operations indicated and recorded in the set of instructions.

The present disclosure is provided to enable any person skilled in the art to practice the various aspects described herein. Various modifications to these example embodiments presented throughout the present disclosure will be readily apparent to those skilled in the art, and the concepts disclosed herein may be applied to other techniques for printing nodes and interconnects. Thus, the claims are not intended to be limited to the example embodiments presented throughout the disclosure, but are to be accorded the full scope consistent with the language claims. All structural and functional equivalents to the elements of the example embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A parts table, comprising:
   a structure including a first surface;
   a base including a region configured to accommodate an autonomous guided vehicle (AGV), and a platform affixed to the structure;
   at least one edge of the platform includes a mechanism for engaging the AGV; and
   kinematic couplers secured to the base and configured to dock with complementary kinematic couplers of an alignment structure, the alignment structure being secured to a floor of an assembly cell,
   wherein the first surface includes a parts interface configured to hold a plurality of parts for assembly in the assembly cell, such that each part of the plurality of parts can be picked up by a robot of the assembly cell when the parts table is docked with the alignment structure, and wherein the parts table is movable to a new location when the kinematic couplers are undocked from the alignment structure.

2. The parts table of claim 1, further comprising a frame coupled to the structure and to the base, the frame configured to stabilize the structure.

3. The parts table of claim 1, wherein the base includes spaced-apart elongated members to which the kinematic couplers are secured.

4. The parts table of claim 1, wherein the mechanism includes a latch for engaging with the AGV.

5. The parts table of claim 1, wherein a lower surface of the platform includes a part retention device for mating with a complementary retention device on the AGV when an upper surface of the AGV is raised upward toward the platform.

6. The parts table of claim 1, further comprising a utility coupler interface connected to the base and configured to engage with a utility system interface connected to the alignment structure, to receive any one or more of power, data communications, or pneumatics for use at the parts table.

7. The parts table of claim 1, wherein the AGV, when engaged with the parts table, uses a detector to locate at least one docking target extending upward from a base plate of the alignment structure, the base plate connected to a floor surface, wherein the AGV enters the alignment structure between two prong members extending laterally outward from the base plate of the alignment structure, such that the two prong members form a gap for the AGV to enter, the AGV being further movably guided by a plurality of guide rollers coupled along an inner edge of each prong member to position and engage the kinematic couplers with the complementary kinematic couplers.

8. The parts table of claim 1, further comprising:
a plurality of universal part interfaces connected to the parts interface, wherein each universal part interface of the plurality of universal part interfaces is configured to hold one of a plurality of differently-shaped parts.

9. The parts table of claim 8, wherein each universal part interface of the plurality of universal part interfaces includes a lever configured to tilt on a first axis to a second position at which a part being held is at a different orientation.

10. The parts table of claim 1, wherein the parts interface comprises a mating feature configured to engage with a complementary mating feature of each part of the plurality of parts.

11. The parts table of claim 10, wherein the mating feature includes at least a pin or a ball bearing.

12. The parts table of claim 1, wherein the parts interface comprises a compliance interface.

* * * * *